United States Patent [19]

Linder et al.

[11] Patent Number: 4,604,204

[45] Date of Patent: Aug. 5, 1986

[54] POROUS, SEMIPERMEABLE MEMBRANES OF CHEMICALLY MODIFIED CELLULOSE ACETATE

[75] Inventors: Charles Linder, Rehovot; Mordechai Perry, Petach Tikvah, both of Israel

[73] Assignee: Aligena AG, Basel, Switzerland

[21] Appl. No.: 554,881

[22] Filed: Nov. 23, 1983

Related U.S. Application Data

[63] Continuation of Ser. No. 190,524, Sep. 18, 1980, abandoned.

[30] Foreign Application Priority Data

Sep. 19, 1979 [CH] Switzerland .................... 846079

[51] Int. Cl.$^4$ ............................................. B01D 13/04
[52] U.S. Cl. ............................... 210/490; 210/500.2; 210/506; 210/500.30
[58] Field of Search ................... 210/490, 500, 506; 55/158; 190/524

[56] References Cited

U.S. PATENT DOCUMENTS

| | | | |
|---|---|---|---|
| 3,497,072 | 2/1970 | Cannon | 210/500.2 |
| 3,579,288 | 5/1971 | Suszer | 8/116.2 |
| 3,723,306 | 3/1973 | Bridgeford | 210/22 |
| 3,857,782 | 12/1974 | Crowley | 210/22 |
| 3,872,001 | 3/1975 | Davis et al. | 210/58 |
| 4,035,146 | 7/1977 | Brenner et al. | 424/181 X |
| 4,230,463 | 10/1980 | Henis et al. | 210/500.2 X |
| 4,239,545 | 12/1980 | Uemura et al. | 210/500.2 X |
| 4,250,029 | 2/1981 | Kiser et al. | 210/500.2 X |

FOREIGN PATENT DOCUMENTS

| | | |
|---|---|---|
| 2505255 | 7/1976 | Fed. Rep. of Germany . |
| 2522821 | 11/1976 | Fed. Rep. of Germany . |
| 2855775 | 7/1979 | Fed. Rep. of Germany . |
| 1158512 | 7/1969 | United Kingdom . |
| 1504261 | 3/1978 | United Kingdom . |

OTHER PUBLICATIONS

Hoffer, Erica et al., "Ion Separation by Hyperfiltration . . . ", Ind. Eng. Chem. Process Des. Develop., vol. 11, No. 2, 1972 pp. 226-228.

*Primary Examiner*—David Sadowski
*Attorney, Agent, or Firm*—Wenderoth, Lind & Ponack

[57] ABSTRACT

Cellulose acetate containing membranes which have pore diameters of about 10 to 1000 Å are modified by reacting these membranes (a) with (b) an at least difunctional compound, e.g. cyanuric chloride, (c) a polyfunctional oligomer or polymer, e.g. polyethyleneimine, and then with (d) a compound which contains at least one ionic group and one group capable of reaction with component (c). Reactant (d) is necessary only if the polyfunctional component (c) does not already contain sufficient ionic groups.

The novel membranes are suitable for ultrafiltration and can be used for example for separating monovalent ions of low ionic weight from polyvalent ions of low or relatively high ionic weight of from monovalent ions of relatively high ionic weight and for separating ionic compounds (salts) from non-ionic (organic) compounds or from ionic compounds which have a different molecular weight or opposite charge. They can be used for example for separating salts from organic compounds (dyes) or in waste-water treatment.

19 Claims, No Drawings

POROUS, SEMIPERMEABLE MEMBRANES OF CHEMICALLY MODIFIED CELLULOSE ACETATE

This is a continuation of co-pending application Ser. No. 190,524, filed Sept. 18, 1980, now abandoned.

The present invention relates to improved semipermeable membranes in diffusion processes such as reverse osmosis (RO) or ultrafiltration (UF). Specifically the invention provides membranes made from chemically modified celluloseacetate containing membranes showing improved permeability (flux) and rejection characteristics.

RO-membranes are dense membranes with pore diameters of 1 to 15 Å which effectively reject low-molecular salt, such as sodium chloride and in particular reject these salts to the extent of more than 50% or preferably more than 90%. UF-membranes have larger pore diameters and the rejection for the same low-molecular salts is less than 10%. Since these definitions tend to be arbitrary, there can be membranes which have pore diameters which give rise to a rejection of less than 50% and more than 10% for sodium chloride. Such membranes are classified between the RO-membranes and the UF-membranes.

The membranes according to the invention can be regarded either as UF-membranes and/or as UF/RO-intermediate membranes.

It is known to use cellulose acetate containing membranes in reverse osmosis techniques for example for the desalination of water or for waste water treatment (U.S. Pat. No. 3,497,072, U.S. Pat. No. 3,593,855).

The mechanical and chemical stability of cellulose acetate membranes limits their operation to a narrow range of pH and temperature. Membranes based on cellulose acetate are widely used but they generally suffer from low fluxes when they have high rejections. In addition the membranes are soluble in organic solvents and compact under high pressure.

These disadvantages can be minimized by using chemically modified cellulose acetate membranes obtained according to the inventive method described hereinafter.

It is thus one object of the present invention to provide new porous, modified cellulose acetate membranes suitable for ultrafiltration, which comprise (a) a cellulose acetate containing membrane to which, via (b) at least one bridge member, (c) at least one polyfunctional, linear or branched oligomer or polymer is bonded, which in turn is substituted by (d) radicals containing ionisable groups.

The membranes have prior to said modification, at the surface pores with a diameter of 10 to 1000 Å, preferably of 10 to 500 Å.

The membranes according to the invention are modified, porous, cellulose acetate membranes which have dimensions such that they are, for example, permeable to low-molecular salts of monovalent ions but display more powerful rejection of polyvalent ions of relatively high and relatively low molecular weight or of high-molecular monovalent ions or non-ionic compounds.

The inventive membranes can be symmetrical or asymmetrical self-supporting or supported ones (100 to 500 microns thick) or thin film composites (0.5 to 10 microns thick) on a porous substrate. The pore diameter of the unmodified cellulose acetate membrane is as mentioned above and most preferably between 10 to 200 Å and in particular between 10 to 120 Å or 10 to 70 Å.

Thus two different cellulose acetate membranes having significant different rejections to a given solute (e.g. 40% and 90%) may be modified by the processes of the present invention to have higher and more equivalent rejection to the same said solute (e.g. above 98%).

It is another object of the present invention to provide methods of manufacturing of the inventively modified cellulose acetate membranes, either self-supporting or supported.

It is a further object of the present invention to provide besides the self-supporting and relatively thick supported cellulose acetate membranes described above—composite membranes which contain the modified cellulose acetate as a superficially thin film on a microporous support.

A further object of the present invention is the use of the new membranes in fields involving concentration and purification of liquids, e.g. separating salts from organic compounds (dyes) or purifying waste waters. The process comprising disposing on one side of a semipermeable membrane a solution with a solute and applying a hydraulic pressure being greater than the osmotic pressure of said solution against said solution and said membrane.

These and other objects of the present invention will be apparent from the following detailed description.

The process for the preparation of the membranes according to the present invention comprises the steps of (a) reacting a cellulose acetate-containing membrane, the pore size of which being 10 to 1000 Å, with (b) an organic compound which contains at least one group capable of reaction with the hydroxyl groups of the membrane substance and at least one group capable of reaction with a polyfunctional oligomer or polymer (component c), the procedure being such that the reaction product obtained from components (a) and (b) still has at least one reactive group, then with (c) a polyfunctional oligomer or polymer and further with (d) a compound which contains at least one ionic group and at least one group capable of reaction with component (c), if component (c) does not itself already possess sufficient ionic groups.

This process described before is the common method for making the self-supporting and supported membranes. More particularly it comprises the reaction steps of reacting (a) with (b), (c) (containing no ionic groups) and (d) or of reacting (a) with (b) and (c) (containing ionic groups).

Using this process it is possible to prepare modified cellulose acetate membranes which have pore diameters which embrace a distinctly wider range than has been possible hitherto, such that the resultant membranes irrespective of initial pore size have high rejection to a given solute.

This is achieved by increasing the ratio of the charged moieties to the hydroxyl groups of the cellulose acetate membrane, by hanging a polyfunctional oligomer or polymer, via a bridge member, onto the hydroxyl groups and then providing the polymer with charges, either by reaction with a compound containing ionisable (anionic) groups or, for example, by quaternisation of amino groups (formation of cationic groups), which the polymer already contains.

The modified cellulose acetate membranes according to the invention therefore reject, for example, polyvalent ions more easily than monovalent ions (for example $Na^{\oplus}$).

The optimum acetyl content in the membranes according to the invention is about 36–41% by weight. If desired, the acetyl content can also be lower or higher if a partial hydrolysis or acetylation is first carried out prior to modification. The membranes according to the invention can also contain further charged or uncharged additives. For example, the membranes can be prepared from mixtures of polymers which contain cellulose acetate as one component, or the cellulose acetate component itself can also contain further (charged or uncharged) groups other than acetate or hydroxyl groups.

Celluloses with different degrees of acylation are suitable as the cellulose acetate to be used as component (a). Preferably, the cellulose acetate used is so-called cellulose 2½-acetate.

Cellulose acetate UF- or UF-RO-membranes are commercially available (e.g. Osmonics Inc., Hopkins, Minn., U.S.A.; Danske Sukkerfabrikker, Nakskov, Denmark; Paterson Candy International, London, U.K.) or are readily cast by one practiced in the state of the art, and such said preparations of casting solutions and methods for casting are cited in the patent and technical literature (e.g. G.B. 1,158,512).

Component (b) forms the bridge member between the cellulose acetate (component a) and the polyfunctional component (c). Substances which can be used as component (b) are monomeric or polymeric compounds which possess crosslinking properties and can enter into chemical bonding both with component (a) and with component (c). These compounds, which have at least two functional groups, possess their reactivity by virtue of multiple bonds, epoxide groups, aziridine groups, aldehyde groups, imidate groups, isocyanate or isothiocyanate groups, hydroxyl groups, anhydride groups, acylhalide groups or N-methylol groups, to which further substituents can be added on, or of substituents detachable as a tertiary amine of preferably as an anion, and combinations of these are also possible. The compounds contain, for example, the grouping

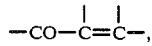

—CO—C≡C— or

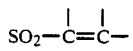

(multiple bond) which may be further substituted. The isocyanate or isothiocyanate group can also be considered as a groups of this type. Component (b) can contain quaternary ammonium groups, which are detached as tertiary amines, for example a trimethylammonium or pyridinium group or sulfonium groups, as the detachable groups. However, component (b) preferably contains substituents containing a radical detachable as an anion, and preferably containing a reactive halogen atom. Such radicals which are detachable as an anion possess their reactivity by virtue of, for example, the influence of electrophilic groups, such as the —CO— or —SO$_2$— group in saturated aliphatic radicals. They also possess their reactivity by virtue of the influence of a quaternary nitrogen atom, such as in the group

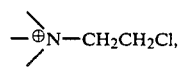

or in aromatic radicals by virtue of the influence of electrophilic groups in the o- and p-position, for example nitro, hydrocarbon-sulfonyl or hydrocarbon-carbonyl groups, or of the bond to a ring carbon atom which is adjacent to a tertiary ring nitrogen atom, as in halogenotriazine or halogenopyrimidine radicals.

Compounds which have proved particularly advantageous as component (b) are cyclic carbonic acid imide halides and in particular halogeno-diazine or -triazine compounds containing at least two reactive substituents. Tetrachloropyrimidine and in particular cyanuric chloride have proved particularly advantageous.

The cyclic carbonic acid imide-halides used here as component (b) are advantageously
(A) s-Triazines, containing at least two identical or different halogen atoms bonded to carbon atoms, for example cyanuric chloride, cyanuric fluoride, cyanuric bromide and also primary condensation products of cyanuric fluoride or cyanuric chloride or cyanuric bromide and, for example, water, ammonia, amines, alkanols, alkylmercaptans, phenols or thiophenols;
(B) Pyrimidines containing at least two reactive, identical or different halogen atoms, such as 2,4,6-trichloro-, 2,4,6-trifluoro- or 2,4,6-tribromo-pyrimidine, which can be further substituted in the 5-position, for example by an alkyl, alkenyl, phenyl, carboxyl, cyano, nitro, chloromethyl, chlorovinyl, carbalkoxy, carboxymethyl, alkylsulfonyl, carboxamide or sulfonamide group, but preferably by halogen, for example chlorine, bromine or fluorine. Particularly suitable halogenopyrimidines are 2,4,6-trichloro- and 2,4,5,6-tetrachloro-pyrimidine;
(C) Halogenopyrimidinecarboxylic acid halides, for example dichloropyrimidine-5- or -6-carboxylic acid chloride;
(D) 2,3-Dihalogeno-quinoxaline-, -quinazoline- or -phthalazinecarboxylic acid halides or -sulfonic acid halides, such as 2,3-dichloro-quinoxaline-6-carboxylic acid chloride or -6-sulfonic acid chloride, 2,6-dichloro-quinazoline-6- or -7-carboxylic acid chloride and 1,4-dichlorophthalazine-6-carboxylic acid chloride or acid bromide;
(E) 2-Halogeno-benzthiazole- or -benzoxazole-carboxylic acid halides or -sulfonic acid halides, such as 2-chloro-benzthiazole- or benzoxazole-5- or -6-carboxylic acid chloride of -5- or -6-sulfonic acid chloride; and
(F) Halogeno-6-pyridazonyl-1-alkanoyl halides or -1-benzoyl halides, for example 4,5-dichloro-6-pyridazonyl-1-propionyl chloride or -1-benzoyl chloride.

Further compounds which contain at least two reactive substituents and can be employed as component (b) are, for example,
(G) Anhydrides or halides of aliphatic, α,β-unsaturated mono- or di-carboxylic acids having preferably 3 to 5 carbon atoms, such as maleic anhydride, acryloyl chloride, methacryloyl chloride and propionyl chloride;

(H) Anhydrides or halides of aliphatic mono- or dicarboxylic acids having preferably 3 to 10 carbon atoms, or of aromatic carboxylic acids, containing mobile halogen atoms, for example chloroacetyl chloride, β-chloropropionyl chloride, α,β-dibromopropionyl chloride, α-chloro- or β-chloro-acryloyl chloride, chloromaleic anhydride and β-chloro-crotonoyl chloride and fluoro-nitro- or chloro-nitro-benzoic acid halides or -sulfonic acid halides in which the fluorine atom or the chlorine atom is in the o-position and/or p-position relative to the nitro group;

(I) Carboxylic acid N-methylolamides or reactive functional derivatives of these methylol compounds. Carboxylic acid N-methylolamides are in particular N-methylol-chloroacetamide, N-methylol-bromoactamide, N-methylol-α,β-dichloro- or -dibromo-propionamide, N-methylolacrylamide and N-methylol-α-chloro- or -α-bromo-acrylamide. Reactive derivatives of the carboxylic acid N-methylolamides are, for example, the corresponding N-chloromethyl- or N-bromomethyl-amides;

(J) Free or etherified N-methylolureas or N-methylolmelamines, for example N,N-dimethylolurea, N,N-dimethylolurea dimethyl ether, N,N'-dimethylolethylene- or -propylene-urea, 4,5-dihydroxy-N,N'-dimethylolethyleneurea or 4,5-dihydroxy-N,N'-di-methylolethyleneurea dimethyl ether and di-bis-hexamethylolmelamine, trimethylolmelamine dimethyl ether, pentamethylol-melamine di-bis-trimethyl ether and hexamethylol-melamine pentamethyl or hexamethyl ether;

(K) Condensation products of diarylalkanes containing at least one phenolic hydroxyl group and halogenohydrins, for example the diepoxide obtained from 2,2-bis-(4'-hydroxyphenyl)-propane and epichlorohydrin, as well as glycerol triglycidyl ethers and also corresponding diaziridines;

(L) Di-aldehydes, for example glutaraldehyde or adipaldehyde;

(M) Diisocyanates or Diisothiocyanates, such as alkylene ($C_2$–$C_4$)-diisocyanates, e.g. ethylene diisocyanate, phenylene or alkyl ($C_2$–$C_4$)-substituted phenylene diisocyanates, e.g. phenylene-1,4-diisocyanate or toluene-2,4-diisocyanate, or phenylene diisothiocyanates, for example phenylene-1,4-diisothiocyanate;

(N) Further reactive compounds, such as trisacryloylhexahydro-s-triazine.

The components (c) are polyfunctional oligomers or polymers which contain aliphatic or aromatic amino groups, which can be primary, secondary or tertiary amino groups; furthermore, these components can contain hydroxyl or thiol groups. Examples of such polymers are polyethyleneimine, (M.W. 150 to 1,000,000) which can be partially alkylated (methyl iodide) or otherwise modified, polyvinylamine (molecular weight 1000 to 2,000,000), polyvinyl alcohol (molecular weight of 2,000 to 200,000) or partially esterified polyvinyl alcohol, cellulose derivatives, such as ethylcellulose, carboxymethylcellulose, hydroxymethylcellulose and hydroxyethylcellulose, and also polyvinylaniline (molecular weight 200 to 2,000,000), polybenzylamines, polyvinylmercaptan, polymers of 2-hydroxyethyl or 2-aminoethyl methacrylates and copolymers, block polymers or graft polymers of these monomers and/or polymers and also further monomers and/or polymers, especially those containing ionic groups (—$SO_3^\ominus$, —$COO^\ominus$, —$^\oplus NR_4$). Examples of such polymers are the copolymers of styrenesulfonate (sodium salt)-/vinylaniline, 2-aminoethyl methacrylate/acrylic acid, vinylaniline/vinylbenzyltrimethylammonium chloride or vinylamine/vinylsulfonate.

Preferred component (c) are polyvinyl alcohols, cellulose derivatives, polyvinylamines and polyvinylanilines and preferably polyethyleneimines as well as the examples of the copolymers mentioned before.

The radicals containing ionisable groups are either already attached to the polyfunctional oligomer or polymer (c) or are introduced by means of component (d). The ionisable group is bonded covalently and the counter ion is mobile and replaceable. An anionic bonded group is to be understood as meaning a group in which the negative ion is bonded to the membrane and the counter ion is mobile and replaceable. In the case of a cationically ionisable group, the situation is reversed.

Reagents which contain an ionisable group and the radical which forms a bridge member between this group and the membrane can be colourless or coloured compounds, for example ionic reactive dyes, which can belong to various categories, for example anthraquinone, formacyl or preferably azo dyes which are optionally metal complexes. Reactive groups which enable these reagents to bond to the (modified) membrane are the following:

carboxylic acid halide groups, sulfonic acid halide groups, radicals of α,β-unsaturated carboxylic acids or amides, for example of acrylic acid, methacrylic acid, α-chloroacrylic acid, α-bromoacrylic acid or acrylamide radicals of preferably low halogenoalkylcarboxylic acids, for example of chloroacetic acid, α,β-dichloropropionic acid or α,β-dibromopropionic acid; radicals of fluorocyclobutanecarboxylic acids, for example of tri- or tetra-fluorocyclobutanecarboxylic acid; radicals containing vinylacyl groups, for example vinylsulfone groups or carboxyvinyl groups; radicals containing ethylsulfonyl (—$SO_2CH_2CH_2OSO_2OH$, —$SO_2CH_2CH_2Cl$) or ethylamino sulfonyl groups (—$SO_2NHCH_2CH_2OSO_2OH$) and halogenated heterocyclic radicals derived from dihaloquinoxalines, dihalopyridazones, dihalophthalazines, halobenzothiazoles and preferably halogenated pyrimidines or 1,3,5-triazines such as monohalotriazines, dihalotriazines, 2,4-dihalopyrimidines or 2,4,6-trihalopyrimidines. Suitable halogen atoms are fluorine, bromine and especially chlorine atoms.

Examples of reactive groups present in component (d) are monochlorotriazinyl, dichlorotriazinyl, 2,4-dichloropyrimidinyl, 2,3-dichloroquinoxaline-6-carbonyl, 4,5-dichloro-pyridazonylpropionyl, 1,4-dichlorophthalazine-6-carbonyl, chlorobenzothiazole linked to the dye via —CONH, —$SO_2NH$—, —NH-Ar-N=N— (Ar=phenylene or naphthylene), 5-chloro-4-methyl-2-methylsulphonyl pyrimidinyl, vinylsulphonyl, β-sulphato äthylsulphonyl, β-sulphatoethyl aminosulphonyl, β-chloroethylsulphonyl or β-sulphatopropionamido.

Mostly preferred components (d) are reactive azo dyestuffs containing sulphonic acid (—$SO_3H$) or carboxyl (—COOH) groups (either group may also present in salt form, such as in form of an alkali metal salt (sodium salt) and as reactive groups monochlorotriazinyl, dichlorotriazinyl, 2,4-dichloropyrimidinyl, vinyl sulfonyl, β-sulfatoethylsulfonyl, β-chloroethylsulfonyl or β-sulfatoethylaminosulfonyl radicals.

Ionisable groups which the membrane-modifying substances (or the membranes obtained after modifying) can contain are, for example, sulfato groups, sulfonic acid group, carboxylic acid group, ammonium groups formed from primary, secondary or tertiary amino groups and hydrogen, or quaternary ammonium groups and also phosphonium or sulfonium groups. Particularly advantageous results are achieved with substances containing sulfonic acid groups.

The membranes which contain at least at the membrane surface an oligomer or polymer (c) modified by an azo dye containing sulfonic acid groups are particularly valuable and versatile in use. The azo dye can also contain a metal, for example copper, bonded as a complex.

Furthermore, it is also possible to introduce the charged groups into the membrane by reacting reagents, such as alkyl halides or benzyl halides, with an amino group of the polymer chain. In this way, for example the polyethyleneimine radical can be modified by methyl iodide or dimethyl sulfate. On the other hand, the modification can also be effected with chlorosulfonic acid itself.

The process for the manufacture of the membranes starts with a reaction of the membrane containing cellulose acetate with a solution containing component (b), which reacts with the non-acylated hydroxyl groups or the starting membrane. The reaction conditions are so chosen that not all of the reactive functional groups of component (b) are consumed, i.e. bonded to the hydroxyl group of component (a). The unconverted groups in component (b), which is now bonded to the membrane, are now reacted with the polymeric or oligomeric, polyfunctional component (c). It is also possible for some of the molecules of reactive component (b) to react with more than one hydroxyl group of component (a), so that the membrane becomes cross-linked thus improving solvent and pressure resistance. By monitoring the reaction conditions, such as concentration, reaction time, temperature and pH-value, the proportion of the polyfunctional reactive molecules which crosslink (and thus bond more than one hydroxyl group) can be controlled. After this reaction, the membrane is removed from this solution and introduced into a second solution, which contains component (c). Some of the functional groups of component (c) are now further reacted with the reactive groups of the reaction product of (a) and (b), whilst other groups remain free for further reactions. The variables in this reaction stage (duration, concentration, time and pH-value) depend on the polymerisation product, functional groups and steric hindrance of component (c). In the final step of the modification of the membranes, ionic groups are also be introduced by further reacting the reaction product of components (a), (b) and (c) with an aqueous solution of component (d).

The individual reactions are as a rule carried out using 1–30% solutions of component (b), (c) and (d); they each can take 1–150 minutes.

If component (b) is, for example, cyanuric chloride, approximately 0.5 to 10% solutions in petroleum ether (boiling range 40° to 200° C.) or in another solvent which does not dissolve the membrane, can be allowed to act for half an hour to 4 hours on the membrane can be allowed to act for half an hour to 4 hours at temperatures of 0° to 40° C. on the membrane which has previously been treated with alkali, for example sodium bicarbonate solutions. The reaction time is shorter if more highly concentrated solutions of component (b) are used. The quantity of cyanuric chloride molecules bound to the cellulose acetate containing membrane can vary in a broad range, e.g. from 0.05 to 1.3 mMol per gram of the dry membrane. This range has however no limiting character for the feasibility of the inventive modification. Instead of organic solutions of component (b) (cyanuric chloride) aqueous suspensions at reaction temperatures of 0° to 4° C. can be used. After intermediate rinsing, the membrane can then be allowed to react with, for example, polyethyleneimine (component (c)), which is initially introduced as a 5 to 20% aqueous solution, the pH-value of which has been adjusted to 8 to 12, for example using sodium hydroxide. The reaction time can be from about half an hour to 4 hours and the reaction temperature can be about 0° to 40° C. After further intermediate rinsing with water, the reaction with component (d), for example a reactive dye, is then carried out and the reaction can be carried out in one of two stages. In the two-stage process, the membrane is immersed for about 5 to 30 minutes in a dye/salt solution (for example dye (0.5–3%)/sodium chloride (5–15%)) and the temperature can be about 20° to 40° C. and the pH-value of the solution can be about 5.0–7.0.

The membrane is then removed from this solution and immersed in another solution, the pH value of which has been adjusted to about 10 to 11.5 (for example using sodium carbonate or another base), and the reaction of the dye with the membrane takes place in this second solution. Reaction temperature: 20° to 40° C.; reaction time: 0.5 to 15. hours. In the single stage process, the adsorption of the dye onto the membrane and the chemical reaction with the membrane take place in the same solution. The reaction conditions correspond approximately to those indicated above, but the dye concentration can be in the range of 1 to 5%, whilst the reaction time is 0.5 to 2 hours.

Instead of a reaction with the dye, methyl iodide or another alkylating agent can also be employed in order, thus, to quaternise the amino groups of the bonded polyethyleneimine (cationically modified membranes).

These reaction conditions suitable for the manufacture of self-supporting membranes can also be used for modifying a cellulose acetate membrane cast on a microporous support to form a so-called composite membrane.

The process for the manufacture of a composite membrane for ultrafiltration comprises casting on one surface of a microporous support, an organic (acetone for example) casting solution of (a) cellulose acetate, passing a stream of air of ambient temperature over the support during casting, evaporating the solvent, drying the coating, optionally repeating said steps at least once, and optionally treating the membrane in an aqueous alkaline solution and modifying the composite membrane by reacting it with (b) an organic compound which contains at least one group capable of reaction with the hydroxyl groups of the membrane substance and at least one group capable of reaction with component (c), the procedure being such that the reaction product obtained from components (a) and (b) still has at least one reactive group, then with (c) a polyfunctional oligomer or polymer and further with (d) a compound which contains at least one ionic group and at least one group capable of reaction with component (c), provided that component (c) itself does not already possess sufficient ionic groups.

The function of the microporous support is to impart mechanical strength to a mechanically weak membrane which controls the flux and rejection properties of the composite system. Suitable support materials are water-insoluble and may be chosen from polyacrylonitriles, polysulfones, polyamides, polyolefines such as polyethylenes or polypropylenes, or cellulosics.

The casting solution contains at a rule 2.5 to 10% of cellulose acetate. Usual solvent systems comprise for example acetone, dimethylformamide, dioxan, acetic acid, methylalcohol, chloroform, N-methyl-pyrrolidone or suitable mixtures thereof.

By choosing an appropriate pore size and a rapid evaporation rate, a minimum amount of penetration of the coating polymers will occur resulting in high flux membranes. Supports with too low pore diameter will impede solvent flow and thus require higher pressures to achieve practical fluxes. Average pore sizes between 0.05 and 0.3 micron form suitable supports, and the preferred support is a monoporous material of polypropylene (Celgard ®3501-Celanese) with rectangular pore dimensions of 0.2 to 0.04 micron.

The thickness of a single wet layer should be in the range of 2 to 15 microns, after drying resulting in 0.2 to 2 microns. This would allow a rapid evaporation of the solvent and a minimum penetration into the pores. It was found that a glass rod resting on the porous support and pulled from behind a quantity of casting solution spreading the said solution gives good results. Similarly results can be obtained by casting successive layers with for example Doctor knives, gravure coating rolls, air knives or meniscus coaters.

Optionally before the modification steps the cellulose acetate layers cast on the microporous support are treated with aqueous alkaline solutions such as aqueous sodium carbonate solutions at room temperature (15° to 30° C.), to achieve cellulose acetate membranes with a different degree of acetylation.

The thickness of the individual layers of cellulose acetate on the microporous support should be in a range of from 0.2 to 10, preferably of from 1 to 6 microns.

Depending on the intended application, the membranes can be in various forms, for example in the form of sheets, leaves or tubes or in the form of a pocket, bag, cone, or of hollow fibres. When subjected to severe pressure, the membranes can, of course, be protected by nonwoven supports, wire screens or perforated plates. Within the range indicated further above, the pore size can be varied by means of different temperatures and can likewise be suited to the particular application. The average charge density (i.e. the content of ionisable groups) of the membrane is advantageously 1–1,000 milliequivalents and preferably 10–500 milliequivalents per kilogram of dry membrane.

Compared with known modified membranes, the membranes according to the invention and the membranes prepared according to the invention have the following advantages:
1. Improved rejection for charged ionic substances, especially ionic substances having a multiple charge, in an aqueous solution,
2. An increase in the difference between the rejection for ions with a multiple charge and the rejection for monovalent ions in aqueous solutions,
3. An improvement in the efficiency of the separation (concentration) of charged ions, especially ions having a multiple charge, from the solvent (water) and
4. An improvement in the efficiency when separating dissolved substances with a multiple charge from dissolved substances with a single charge.
5. An improvement in the membranes' solvent and compaction resistances resulting from the introduction of cross-links between the cellulose-acetate chains. Good stability to high pressures (2 to 40, preferably 2 to 30 bars).

The following applications in particular are advantageous for the membranes according to the invention and, in principle, these applications always concern the separation of monovalent ions of low ionic weight from polyvalent ions of low or relatively high ionic weight or from monovalent ions of relatively high ionic weight, or the separation of ionic substances from non-ionic substances or of ionic compounds of different molecular weights or of opposite charge.
1. The separation of organic and metal-organic ionic substances from by-products from a reaction mixture and other substances which are contained therein, for example from salts, such as sodium chloride, sodium sulfate or sodium acetate.
2. The separation of heavy metal complexes from those salts which do not form complexes (treatment of effluents).
3. The purification of effluents which are obtained from the production and use of dyes and fluorescent brighteners.
4. The separation of proteins or hormones which have similar molecular weights but are of opposite charge.
5. The separation of ionic surfactants (detergents, wetting agents or dispersants) from other chemicals which are still present in the reaction mixture after the preparation of the surfactants (by-products, excess starting materials).
6. The removal of ionic surfactants from effluents.
7. The separation of ionic molecules from water, i.e. the concentration of aqueous solutions which contain metal complexes, surfactants, dyes or proteins and other charged organic compounds, the results obtained in this case being better, with regard to the efficiency (flux per time unit) and the separating effect, than those obtained with known membranes.

The separation effect (the rejection) of the membranes can be measured as follows: a circular membrane with a surface area of 13 cm$^2$, resting on a sintered stainless steel disc, is used in a cylindrical cell made of stainless steel. 150 ml of the solution (to be tested), which contains the substance to be tested in the concentration $c_1$ (g of substance per g of solution), are introduced onto the membrane in the steel cylinder and, using nitrogen, subjected to a pressure of 14 bars. The solution is stirred magnetically. The liquid which collects on the outlet side of the membrane is examined to determine its content (concentration) $c_2$ of the substance to be tested, 3 samples of 5 ml being taken from the start of the experiment. In general, the amount which flows through the membrane and the composition of the 3 samples are constant. The rejection can be calculated from the values obtained, using the equation $$R = \frac{c_1 - c_2}{c_1} \cdot 100(\%)$$

The amount of material passed through the membrane per surface and time unit is found to be $$F = V \cdot S^{-1} \cdot t^{-1}$$

V: volume
S: membrane surface area
t: time

F is appropriately expressed in $m^3 \cdot m^{-2} \cdot d^{-1}$, i.e. the number of cubic meters per square meter of surface area of the membrane and per day, or in $1\ m^{-2} h^{-1}$, i.e. liters per square meter of surface area of the membrane and per hour.

In addition to the measurements on flat membranes, tubular membranes 60 cm long and with an outer diameter of 1.4 cm are also examined. These tubular membranes are placed in a perforated tube made of stainless steel.

The whole is placed in a tube made of polycarbonate. The outflow from the membrane is between this outer polycarbonate tube and the steel tube. The liquid is added as a stream of the solution in turbulent flow, under 20 bars pressure. The flow rate is kept constant at 10-15 liters per minute. The rejection (R) and the flux (F) are calculated in the same way as for the flat membranes.

In the following examples, the dyes and colourless compounds of formulae (5) to (9) and (11) to (18) are used as component (d); the compounds of formulae (1) to (4) and (10) are used as test solutes.

2:1 Cr complex of (1)

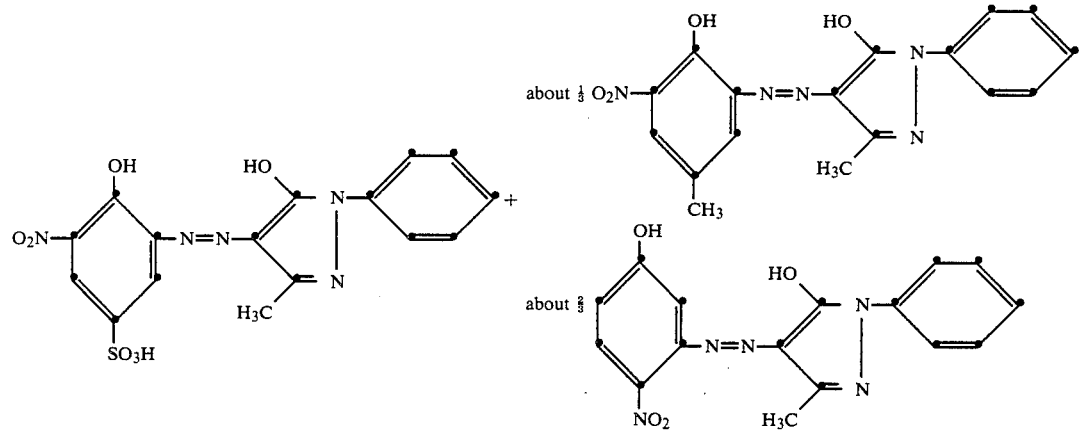

(2)

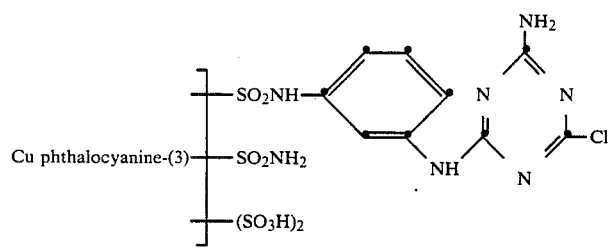

(3)

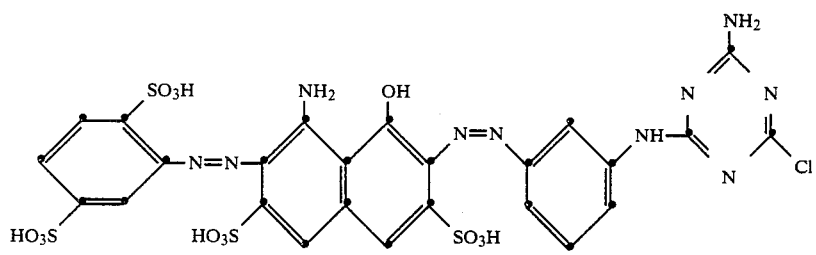

(4)

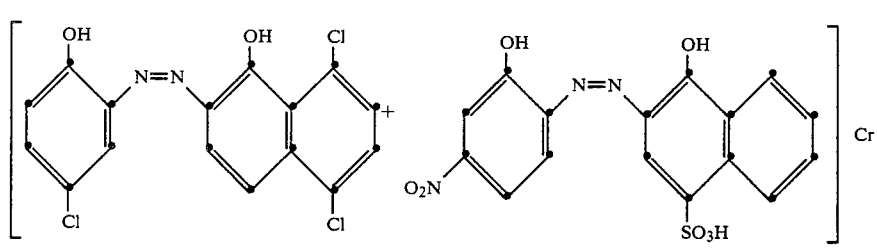

2:1 Cr complex of
(5) 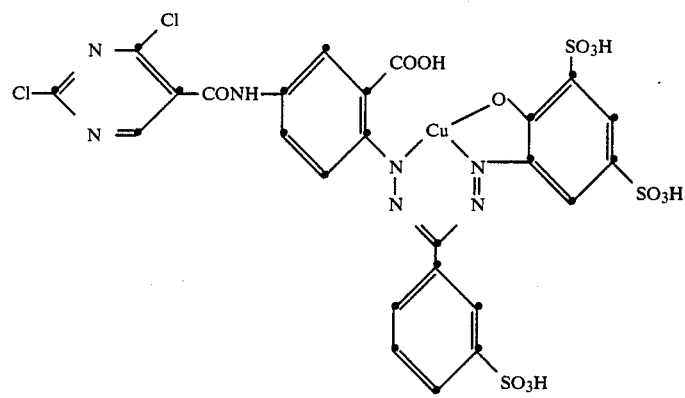
(6) 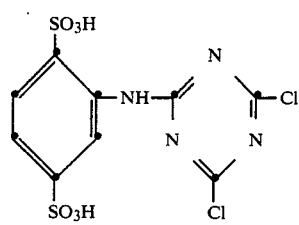
(7) 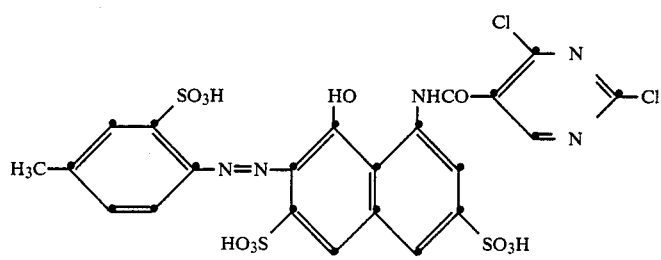
(8) 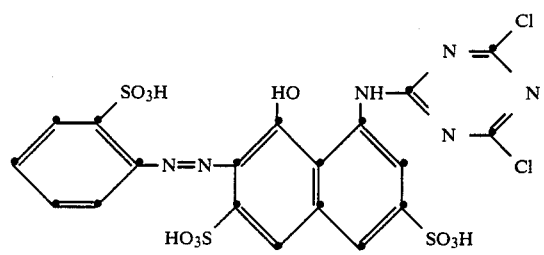
(9) 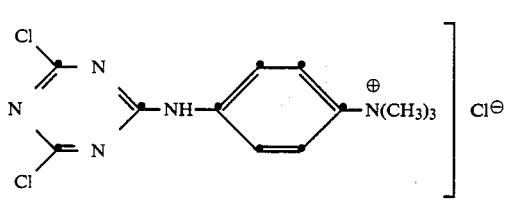
(10) 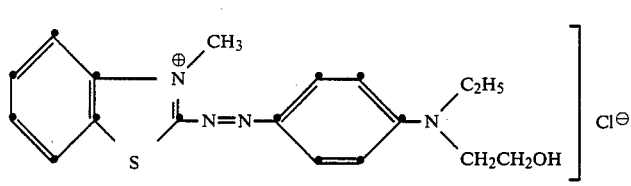

2:1 Cr complex of
(11) 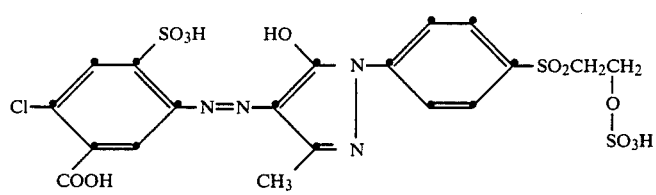
(12) 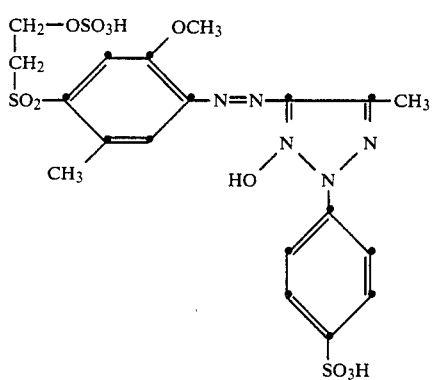
(13) 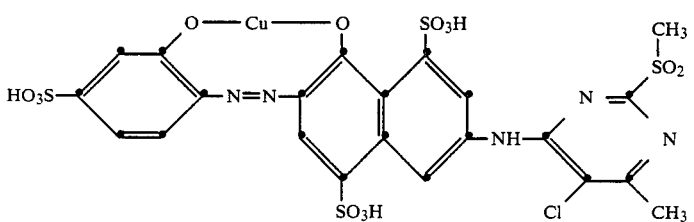
(14) 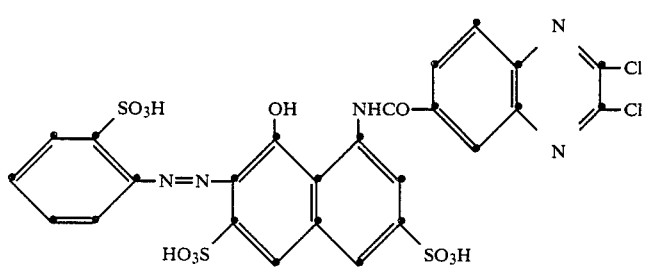
(15) 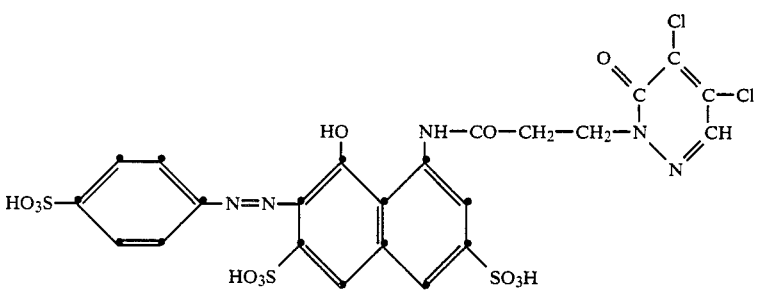

2:1 Cr complex of

(16) 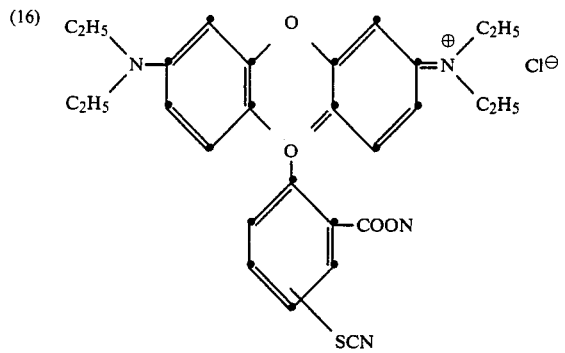

(17) 1-Amino-4-acryloaminobenzene-3-sulfonic acid, diazotised and coupled with 1-Oxynaphthalene-4-sulfonic acid.

(18) 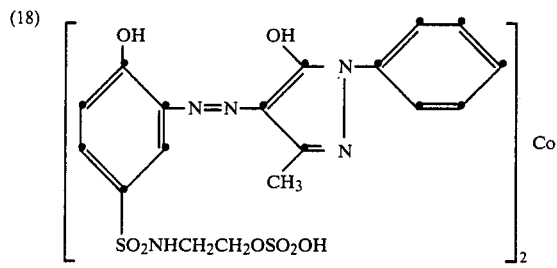

In the following examples, parts and percentages are by weight.

EXAMPLES

The cellulose acetate membranes (38.9% acetyl content) modified according to the invention in the examples which follow are prepared from the following starting membranes:

charged with ionisable groups. The four membranes are then tested to determine their rejection and flux, the tests being carried out with a 7% solution of the dye of the formula (3) under a pressure of 13 bars and at room temperature. For comparison, the unmodified membranes $M_1$ and $M_3$ are also compared, as is a membrane (5), which has been obtained by simply reacting the membrane $M_1$ with the reactive dye of the formula (5).

TABLE 1

| Membrane | Molecular weight of dextrin which is rejected to the extent of 95% | Maximum working pressure in bar | Pore diameter (Å) | Rejection in % for a 2% solution | | | Flux for a 2% solution of the dye of the formula (3) in $l/m^2 \cdot h$ |
|---|---|---|---|---|---|---|---|
| | | | | Dye of the formula (3) | Sodium chloride | Sodium sulfate | |
| $M_1$ | 1,000 | 25 | 18 | 97 | 19 | 34 | 40 |
| $M_2$ | 1,000–2,000 | 20 | 20 | 90 | | 18 | 80 |
| $M_3$ | 2,000 | 13 | 24 | 82 | 4.5 | 15.0 | 55 |
| $M_4$ | 20,000 | 10 | 43 | 45 | 1.0 | 4.0 | 90 |

EXAMPLE 1

Four 60 cm long tubular membranes of the $M_3$ type are modified as follows: The membranes are treated for 15 minutes with a 5% solution of sodium bicarbonate and then for 2 hours with a 2% solution of cyanuric chloride in petroleum ether (boiling point 80°–100° C.). After the membranes treated in this way have been rinsed in cold water, they are placed in a 20% polyethyleneimine solution (molecular weight 189), the pH value of which has been adjusted to 9 with sodium hydroxide, and are kept in this solution for 2 hours at 40° C. The membranes are then rinsed with water for 2 hours. Two of these membranes are then immersed in a solution which contains 5% of the reactive dye of the formula (5), 10% of sodium chloride and sufficient sodium carbonate to give a pH value of 10.5 and are left in this soluton for 2 hours at room temperature. The other two membranes are left in the original state and not

TABLE 2

| No. | Membrane | Working pressure in bars | Flux $l/m^2 \cdot h$ | Rejection in % |
|---|---|---|---|---|
| 1. | $M_3$-CC-PEI | 13 | 44 | 94.8 |
| 2. | $M_3$-CC-PEI | 13 | 53 | 90.7 |
| 3. | $M_3$-CC-PEI-D | 13 | 43 | 99.4 |
| 4. | $M_3$-CC-PEI-D-D-SO$_3$—Na | 13 | 45 | 98.4 |
| 5. | $M_1$-D-SO$_3$—Na | 25 | 35 | 99.0 |
| 6. | $M_1$ | 25 | 23 | 98.6 |
| 7. | $M_1$ | 13 | 63 | 85 |

CC: cyanuric chloride
PEI: polyethyleneimine
-D-SO$_3$—Na: radical of the bonded reactive dye.

EXAMPLE 2

Membrane M$_3$ is modified in the same way as in Example 1, except that a 10% solution of a polyethyleneimine with a molecular weight of 30,000 is used instead of the solution of a polyethyleneimine with a molecular weight of 189. The flux and the rejection for various solutions are given in Table 3 below for a 13 cm$^2$ flat membrane under 13 bars. 0.5 to 10% polyethyleneimine solutions can be used, the reaction time can be in the range of 5 minutes to 2 hours and the pH value can be in the range of 7 to 12.

TABLE 3

| Compound | Concentration in % | Rejection in % | Flux in l/m$^2$·h |
|---|---|---|---|
| Dye of the formula (1) | 1.0 | 99.99 | 42 |
| Dye of the formula (2) | 1.0 | 99.99 | 30 |
| Sodium chloride | 1.0 | 18.0 | 52 |
| Sodium sulfate | 1.0 | 70.0 | 49 |
| Cane sugar | 2.0 | 58.1 | 52 |
| Sodium dodecyl sulfate | 0.05 | 89.0 | 60 |
| Cobalt citrate | 0.02 | 99.0 | 56 |
| Ethylenediaminetetraacetic acid (mercury complex) | 0.01 | 99.6 | 50 |
| Copper citrate | 0.01 | 99.8 | 62 |

If an aqueous solution which contains 7% of the dye of the formula (3) and 2% of NaCl is filtered through a 60 cm long tubular membrane having the composition indicated in this example, the rejection is 99.9% and −12% (negative salt rejection) respectively.

EXAMPLE 3

Example 2 is repeated except that starting membrane M$_4$ is used in place of starting membrane M$_3$. The rejection and the flux are given in the following table for a 13 cm$^2$ flat membrane under 10 bars.

TABLE 4

| Compound | Concentration in % | Rejection in % | Flux in l/m$^2$·h |
|---|---|---|---|
| Dye of the formula (2) | 1.5 | 99.8 | 76 |
| Dye of the formula (3) | 1.5 | 99.6 | 70 |
| Sodium chloride | 2.0 | 12.0 | 80 |
| Sodium sulfate | 2.0 | 46.8 | 67 |

If the modification procedure employed for membrane M$_4$ is the same as that indicated in Example 1 for membrane M$_3$, the rejection and the flux are 97% and 120 l/m$^2$/h, respectively, for a 1.5% solution of the dye of the formula (3) and 3.8% and 167 l/m$^2$/h, respectively, for a 2% NaCl solution. For the dye of the formula (3), the corresponding unmodified membrane has a rejection of 45%, and the flux is 90 l/m$^2$·h. If membrane M$_4$ is modified only with component (d), the corresponding values for the rejection and the flux are 79% and 90 l/m$^2$·h.

EXAMPLE 4

Example 1 is repeated using membrane M$_2$ in place of membrane M$_3$. The rejection and the flux are given in the following table for a 13 cm$^2$ flat membrane under 20 bars.

TABLE 5

| Compound | Concentration in % | Rejection in % | Flux in l/m$^2$·h |
|---|---|---|---|
| Dye of the formula (3) | 0.5 | 99.5 | 96 |
| Dye of the formula (4) | 0.5 | 99.8 | 74 |
| Sodium chloride | 1.0 | 9.0 | 110 |
| Sodium sulfate | 1.0 | 54.0 | 89 |

EXAMPLE 5

Example 1 is repeated except that the reactive dye of the formula (7) is used. The retentivity and the amount flowing through are given in Table 6 below for a 13 cm$^2$ flat membrane under 13 bars.

TABLE 6

| Compound | Concentration in % | Rejection in % | Flux in l/m$^2$·h |
|---|---|---|---|
| Dye of the formula (3) | 1 | 98.9 | 46 |
| Sodium chloride | 2 | 14 | 61 |

EXAMPLE 6

Example 2 is repeated except that the product of the formula (6) is used. The rejection and the flux are given in Table 7 below for a 13 cm$^2$ flat membrane under 13 bars.

TABLE 7

| Compound | Concentration in % | Rejection in % | Flux in l/m$^2$·h |
|---|---|---|---|
| Dye of the formula (3) | 0.15 | 99.6 | 34 |
| Sodium chloride | 1.0 | 22 | 50 |

EXAMPLE 7

Example 2 is repeated, except that the reactive quaternary ammonium compound of the formula (9) is used in place to the membranes of Examples 1 to 6, this membrane now contains positive groups in place of the negative sulfonic acid groups. The rejection and flux are listed in Table 8 below for a 13 cm$^2$ flat membrane under 13 bars.

TABLE 8

| Compound | Concentration in % | Rejection in % modified | Rejection in % unmodified | Flux in l/m$^2$·h modified | Flux in l/m$^2$·h unmodified |
|---|---|---|---|---|---|
| Dye of the formula (10) | 0.5 | 99.3 | 88 | 24 | 56 |
| CaCl$_2$ | 1.0 | 92.0 | 30 | 30 | 56 |

EXAMPLE 8

Example 2 is repeated, except that the final stage, i.e. the reaction with the dye of the formula (5), is replaced by a reaction with methyl iodide in order to quaternise the amino groups of the bonded polyethyleneimine. With this process, the procedure is to immerse the membrane, after the reaction with the polyethyleneimine, in a petroleum ether solution which contains 2% (0.5 to 5%) of methyl iodide and 2% of sodium bicarbonate (suspended) and to keep the membrane in this solution for 2 hours. The membrane is then washed in water for 2 hours. The rejection and flux are given in Table 9 below for a 13 cm$^2$ membrane under 13 bars.

TABLE 9

| Compound | Concentration in % | Rejection in % | Flux in $l/m^2 \cdot h$ |
| --- | --- | --- | --- |
| Dye of the formula (10) | 1.5 | 98.6 | 35 |
| $CaCl_2$ | 1.0 | 88 | 41 |

EXAMPLE 9

Example 2 is repeated, except that the polyethyleneimine is replaced by polyvinyl alcohol (molecular weight 14,000). The corresponding results for a 13 cm² flat membrane under 13 bars are listed in Table 10 below.

TABLE 10

| Compound | Concentration in % | Rejection in % | Flux in $l/m^2 \cdot h$ |
| --- | --- | --- | --- |
| Dye of the formula (1) | 1.0 | 99.9 | 93 |
| Dye of the formula (3) | 1.0 | 99.8 | 85 |
| Sodium chloride | 1.0 | 8.5 | 105 |
| Sodium sulfate | 1.0 | 62.5 | 81 |

EXAMPLE 10

Example 2 is repeated, except that the reactive dye of the formula (8) is used in place of the reactive dye of the formula (5) as component (d). For a 1% solution of the dye of the formula (3), the rejection and flux are 98.6% and 90 $l/m^2.h$, respectively.

EXAMPLE 11

Example 1 is repeated, except that tetrachloropyrimidine is used in place of cyanuric chloride. The reaction conditions are modified somewhat, to the extent that the reaction of the cellulose acetate membrane with the tetrachloropyrimidine is carried out in the range of 40° to 70° C., and in particular at 50° C. and the reaction with the polyethyleneimine is carried out at 45° C. The test results for a 12 cm² membrane under 13 bars are listed in Table 11 below.

TABLE 11

| Compound | Concentration in % | Rejection in % | Flux in $l/m^2 \cdot h$ |
| --- | --- | --- | --- |
| Dye of the formula (3) | 0.5 | 98.4 | 58 |
| Sodium chloride | 2.0 | 12 | 72 |

EXAMPLE 12

Example 1 is repeated, except that, instead of a petroleum ether solution, an aqueous suspension of cyanuric chloride is used at temperatures of below 4° C. and in particular at 0° C. During the reaction time of 2 hours, the pH value of the aqueous suspension is kept at 6–7 using 1N NaOH. The other conditions are the same as those indicated in Example 1. For a 1% solution of the dye of the formula (3), the rejection and flux are 99.2% and 70 $l/m^2$ h, respectively.

EXAMPLE 13

(a) A solution of 10 g of cellulose acetate in 180 g of acetone is prepared by stirring for 6 hours and filtering through 20 micron, 5 micron and 0.3 micron filters at 2 bars pressure.

The above solution is then cast on a microporous support of polypropylene. A strip of the support is adhered with slight tension at both ends with pressure-sensitive tape to a glass plate. 5.0 ml of cellulose acetate casting solution is applied to one end, and a glass rod pulled from behind this solution down the length of the support strip, while the said rod rests on the support. The cellulose acetate solution is thus coated upon the support. During this process, a stream of air at ambient temperature is passed over the support, evaporation the water and drying the cellulose acetate coating. The evaporation time is less than 1 second. This process is repeated 4 times.

The cellulose acetate-polypropylene strip is removed from the glass plate and completely immersed in an aqueous solution of 0.1N NaOH for 10 hours. The membrane is washed with deionized water until the pH-value of the solution is that of the deionized water. The membrane is then a composite of cellulose on polypropylene. It has a flux and rejection to dye of formula (3) (15000 ppm) at pH 10.0 and 20 bars of 60 $l/m^2.h$ and 95.5%, respectively. After 120 hours at pH 10, the flux and rejection are 58 $l/m^2.h$ and 90.8%, respectively.

(b) The cellulosic composite membrane according to (a) is immersed in an aqueous solution containing 10% sodium chloride and 1% dye of formula (5) for 15 minutes at room temperature. The membrane is then placed in an aqueous solution containing 2% sodium carbonate for 30 minutes, and then rinsed with 1.0% aqueous acetic acid solution. The so modified membrane has a rejection and flux of 98% and 19 $l/m^2.h$, respectively to dye of formula (3), (15,000 ppm) at 20 bars pressure and a pH of 10.0.

After 120 hours at pH 10, the flux and rejection are, respectively, 34.3 $l/m^2.h$ and 98%. In (a) and (b) comparative membranes are prepared. (c) The composite membrane according to (a) is inventively modified with cyanuric chloride, polyethyleneimine and the dye of formula (5) as in Example 1.

The flux and rejection to the dye of the formula (3) (15,000 ppm) at pH 10.0 and 20 bars pressure are 20 $l/m^2.h$ and 99.5%, respectively.

EXAMPLE 14

Example 3 is repeated, using membrane M-4, having a rejection towards 1500 ppm of the dye of formula (3) of 36% and a flux of 108 $l/m^2.h$ at 10 bars. Instead of polyethyleneimine (M.W. 30,000), a 10% aqueous solution of polyvinylamine (M.W. 50,000–160,000) is used. The resultant membrane has a flux and rejection of 20 $l/m^2.h$ and 98.0%, respectively, to the dye of formula (3) (1500 ppm at 10 bars). The resultant membrane is insoluble in dimethylformamide (DMF), acetone, and N-methyl pyrrolidone-(2).

EXAMPLE 15

Example 14 using polyvinylamine is repeated with the difference that instead of polyvinylamine, a copolymer of vinylaminevinyl sulfonate, sodium salt, (60:40) (M.W. 20,000–40,000), is used as a 10% aqueous solution. In addition, because this polymer contains charged groups, the final charging with dye of formula (5) is not carried out. The resultant modified membrane has a flux and rejection to the dye of the formula (3) (1500 ppm at 10 bars) of 55 $l/m^2.h$ and 92%, respectively.

EXAMPLE 16

(a) Example 3 is repeated, using the dye of formula (12) instead of the dye of formula (5). The resultant flux and rejection are 34 $l/m^2$ h and 96%, respectively, to the dye formula (3) (1500 ppm at 10 bars).

(b) As in (a), but using the dye of formula (15) instead of dye of formula (5). The resultant flux and rejection to the dye formula (3) (1500 ppm, at 10 bars) is 29 l/m².h and 97%, respectively.

(c) As in (a), but using the dye of formula (16) instead of the dye formula (5). The resultant flux and rejection to the dye formula (3) (1500 ppm at 10 bars) is 35 l/m².h and 94%, respectively.

EXAMPLE 17

Example 3 is repeated, but instead of the step of cyanuric chloride in petroleum ether, the membrane is immersed in a 10% solution of hexamethylol melamine (for synthesis see U.S. Pat. No. 2,328,592) at pH 8.0 for 2 hours. The resultant membrane has a flux and rejection to the dye of formula (3) (1500 ppm at 10 bars) of 40 l/m².h and 96%, respectively. The modified membrane is insoluble in dimethyl formamide.

What is claimed is:

1. A porous, modified cellulose acetate membrane having a structure suitable for ultrafiltration and reverse osmosis, said membrane being prepared by a sequence of chemical reactions consisting essentially of steps (1) to (3), wherein:

step (1) is reacting (a) a cellulose acetate containing membrane having a pore diameter in the range of from 10 to 1000 Å, with (b) an organic compound which contains at least one group ($b_1$) capable of reaction with hydroxyl groups of the membrane (a), and at least one group ($b_2$) capable of reaction with component (c), to bond the hydroxyl groups to a group ($b_1$), such that a membrane obtained from step (1) has at least one reactive group ($b_2$), step (2) is reacting group ($b_2$) of said membrane with (c) a polyfunctional linear or branched polymer containing functional groups ($c_1$) and ($c_2$), to bond group ($b_2$) to group ($c_1$), and thereby introduce said polymer into said membrane, and step (3) is reacting (d) a compound which contains at least one ionic group and at least one group ($d_1$) capable of reaction with group ($c_2$), provided that said polyfunctional linear or branched polymer (c) itself does not already possess sufficient ionic groups, to bond group ($d_1$) to group ($c_2$) to form a membrane containing said at least one ionic group.

2. A membrane according to claim 1, wherein said organic compound (b) is cyanuric chloride, said polymer (c) is polyethylene imine and said compound (d) is a reactive azo dyestuff containing sulphonic acid or carboxyl groups and as reactive groups monochlorotriazinyl, dichlorotrazinyl, 2,4-dichloropyrimidinyl, vinylsulphonyl, β-sulfatoethylsulfonyl, β-chloroethylsulfonyl or β-sulfatoethylaminosulfonyl radicals.

3. A membrane according to claim 1, wherein the pore diameter of the membrane (a) is 10 to 500 521 .

4. A membrane according to claim 3, wherein the pore diameter of the membrane (a) is 10 to 200 Å.

5. A membrane according to claim 1, wherein the acetate content of the cellulose acetate membrane (a) is 36 to 41 percent by weight.

6. A membrane according to claim 5, wherein the membrane (a) is made of cellulose 2½-acetate.

7. A membrane according to claim 1, wherein said organic compound (b) is a cyclic carbonic acid imide halide, or an isocyanate, isothiocyanate or N-methylol compound.

8. A membrane according to claim 7, wherein said organic compound (b) is a halogeno-diazine or -triazine compound which contains at least 2 reactive substituents.

9. A membrane according to claim 8, wherein said organic compound (b) is cyanuric chloride or tetrachloropyrimidine.

10. A membrane according to claim 1, wherein said polymer (c) contains aliphatic or aromatic amino groups, hydroxyl groups or thiol groups.

11. A membrane according to claim 10, wherein said polymer (c) comprises polyethyleneimines, polyvinyl alcohols, polyvinylamines, vinylamine/vinyl sulfonate copolymers or polyvinylanilines.

12. A membrane according to claim 1, wherein said compound (d) is a colorless or colored compound which contains sulfonic acid groups, carboxylic acid groups or ammonium groups as ionic groups.

13. A membrane according to claim 1, wherein said compound (d) is a reactive azo dye containing sulfonic acid groups, carboxylic acid groups or ammonium groups.

14. A membrane according to claim 13, wherein said compound (d) is a reactive azo dyestuff containing sulphonic acid or carboxyl groups and as reactive groups monochlorotriazinyl, dichlorotriazinyl, 2,4-dichloropyrimidinyl, vinylfulphonyl, β-sulfatoethylsulfonyl, β-chloroethylsulfonyl or β-sulfatoethylaminosulfonyl radicals.

15. A membrane according to claim 1, wherein said organic compound (b) is cyanuric chloride and said polymer (c) is a vinylamine/vinylsulphonate copolymer.

16. A composite semipermeable membrane for ultrafiltration and reverse osmosis which comprises a microporous support and a superficially thin film having semipermeable properties, said film being a chemically modified cellulose acetate membrane according to claim 1.

17. A membrane according to claim 16, wherein the microporous support is of polyolefis, polyacrylonitriles, polyamides, polysulfones or cellulosic material.

18. A membrane according to claim 17, wherein the microporous support is of polypropylene.

19. A membrane according to claim 16, wherein the semipermeable film has a thickness of at least about 0.5 micron.

* * * * *